(No Model.) 2 Sheets—Sheet 1.
D. S. COY.
AUTOMATIC LIQUID MEASURING DEVICE.
No. 599,688. Patented Mar. 1, 1898.
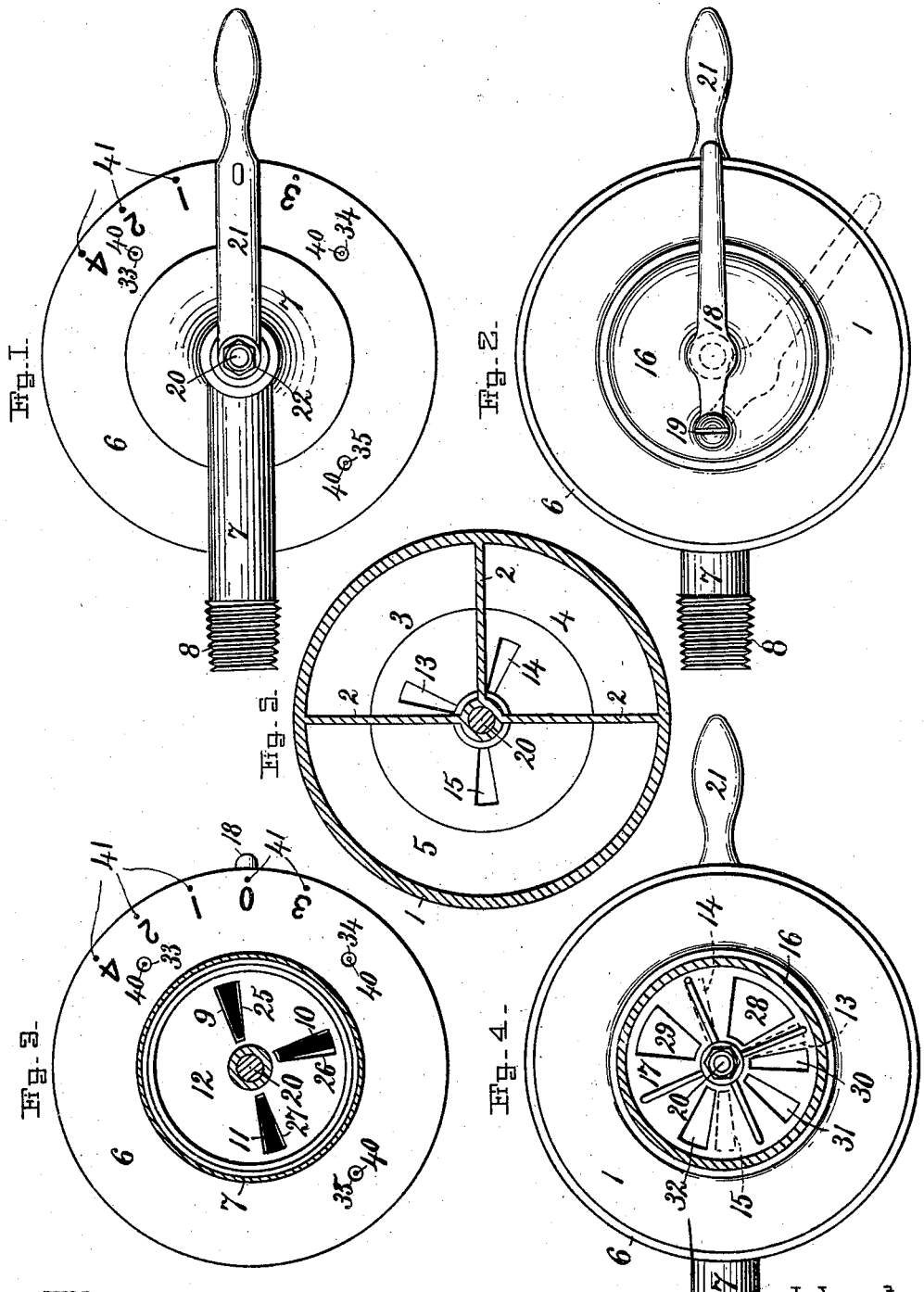
Witnesses
S. Bayard Thompson.
Victor Sandahl.
Inventor
David S. Coy
by
Henry Chadbourn
his Atty.

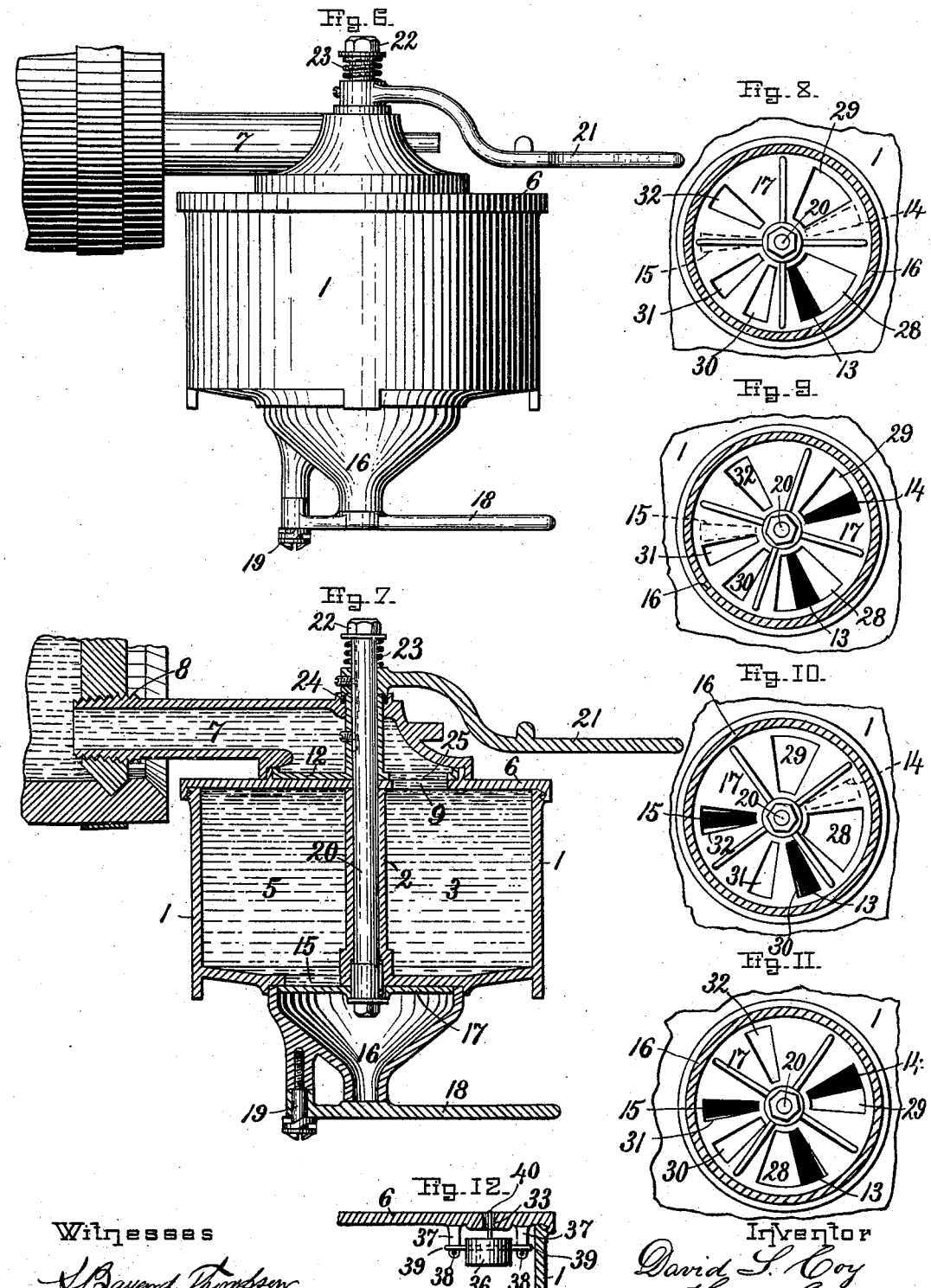

UNITED STATES PATENT OFFICE.

DAVID S. COY, OF BOSTON, MASSACHUSETTS.

AUTOMATIC LIQUID-MEASURING DEVICE.

SPECIFICATION forming part of Letters Patent No. 599,688, dated March 1, 1898.

Application filed June 27, 1896. Serial No. 597,154. (No model.)

*To all whom it may concern:*

Be it known that I, DAVID S. COY, of Boston, in the county of Suffolk and State of Massachusetts, have invented certain new and useful Improvements in Automatic Liquid-Measuring Devices, of which the following, taken in connection with the accompanying drawings, is a specification.

This invention relates to improvements in automatic liquid-measuring devices whereby liquid in predetermined amounts may be drawn from a common source of supply through the same delivery-nozzle by the manipulation of a suitable valve. The invention is especially useful for drawing molasses from the hogshead or tank in which it is kept; but it may be used for other liquids, as vinegar, wine, beer, cider, milk, oil, &c.

The objects of the invention are to prevent dust, flies, or other impurities from getting into the liquids, to dispense with the use of individual measures for the different amounts to be drawn, to prevent the liability of overflowing the measure and thus wasting the liquid, to keep the floor surrounding the receptacle from which the liquid is to be drawn in a neat condition, and to prevent the liability of accidentally leaving the outlet of the receptacle containing the liquid open, and consequently losing more or less of its contents.

The invention consists of a closed casing having valved inlet, preferably in the form of a tube-screw threaded on its exterior and adapted to enter the tap-hole of the hogshead or other receptacle containing the liquid to be measured. The casing is divided into spaces containing various amounts, according to the different quantities to be measured and drawn, and said casing is also provided with an outlet-nozzle capable of being brought into open communication with either, all, or any number of the spaces into which the receptacle is divided, by the proper manipulation of a valve. This outlet-nozzle is provided with an attached cover.

The invention also consists of minor details of construction and combinations of parts, as fully set forth hereinafter and claimed in the annexed claims; and the invention is carried out substantially as illustrated on the accompanying drawings, which form an essential part of this specification, and whereon—

Figure 1 represents a top or plan view of the measuring device. Fig. 2 represents a bottom view of the same. Fig. 3 represents a horizontal section above the casing, looking downward and showing the valved inlets into the different spaces into which the casing is divided. Fig. 4 represents a horizontal section below the casing, looking upward and showing the valved outlets from the different spaces into which the casing is divided. Fig. 5 represents a horizontal section over the casing, showing the manner of dividing the casing into spaces of different capacity. Fig. 6 represents a side elevation of the measuring device, showing a small portion of a hogshead to which it is attached. Fig. 7 represents a central vertical section of the same. Figs. 8, 9, 10, and 11 represent bottom views of the outlet-valve and outlets from the casing, showing the same in various positions occupied when drawing the liquid in different amounts from one or a combination of the divisions of the casing. Fig. 12 represents a detail sectional view of one of the vents or inlets into the casing with the automatic operating-valve to close the vent automatically when the division of the casing is full.

Similar characters of reference refer to similar parts wherever they occur on the different parts of the drawings.

The measuring device consists of the casing 1, holding, for instance, one gallon, and is divided into any number of compartments or chambers, all or a part being of different capacities, by the walls 2 2, but which has been shown on the drawings as divided into the three chambers 3, 4, and 5, the chambers 3 and 4 being of equal capacity and each holding, for instance, one quart, while the chamber 5 is of double the capacity of either of the others and holds, for instance, two quarts, it being the most convenient division to be made of the casing, as liquids are generally measured by quarts or gallons. The casing is provided with the cover 6, which may be screwed or otherwise secured liquid-tight thereon, and on the top of said cover is secured the inlet 7, which is tubular, being screw-threaded on its exterior, as at 8, by which it is connected to the tap-hole of the barrel or hogshead. This inlet communicates with the chambers 3, 4, and 5 in the casing through the respective ports 9, 10, and 11, (shown in Fig. 3,) and said communication is opened or closed by the manipulation of the valve 12, the operation and construction of which will be fully explained hereinafter.

The chambers 3, 4, and 5 are provided with the respective outlet-ports 13, 14, and 15, as shown in Fig. 5 and in dotted lines in other figures on the drawings, which ports communicate with the same discharge-nozzle 16 of the measuring device, and said communication is opened or closed by the manipulation of the valve 17, the operation and construction of which will be fully described hereinafter.

The lever 18 is pivoted at 19 to the discharge-nozzle or to a projection therefrom and is adapted to be turned upon its pivot to open or close the mouth of the nozzle, according to whether liquid is to be drawn from the measuring device or not. Thus it will be seen that when the mouth of the nozzle is closed no flies, dust, or other impurities can enter the nozzle. This is a great improvement over the common taps now used, especially when molasses is to be drawn from the measuring device.

The valve 17 is keyed or otherwise firmly secured to the lower end of the valve-stem 20, which projects upward through a perforation in the dividing-walls in the casing and through the inlet 7, where it is provided with a handle 21, which is splined upon the valve-stem. A nut 22 is adjustable up and down upon the outer end of the valve-stem, and a spring 23 surrounds the valve-stem between the under side of the nut 22 and the top of the handle 21, substantially as shown and for a purpose to be described hereinafter.

The hub of the valve 12 is splined upon the valve-stem in such a manner that it is free to move up and down thereon, and said hub projects upward through the shell of the inlet 7, where it comes in contact with the under side of the hub of the handle 21. A packing 24 is interposed between the under side of the hub of the handle and the shell of the inlet 7 in such a manner that the joints between the hub of the handle and the hub of the valve 12 and the shell of the inlet are tightly packed by the pressure of the spring 23 upon the upper surface of the hub of the handle 21. The downward pressure of the spring 23 upon the hub of the handle 21 and the contact of the hub of said handle and the hub of the valve 12 will cause said valve to be held firmly upon its seat on the cover of the casing 1, thus making said valve tight. The pressure of the spring 23 will also have a tendency to draw the valve-stem upward, and consequently cause the valve 17 to be held upon its seat, thus preventing leakage from said valve.

The ports 25, 26, and 27 in the valve 12 are so arranged that they will always all coincide with the respective ports 9, 10, and 11 in the top of the casing at the same time, or said ports will all be closed by the valve 12 at the same time.

The valve 17 is provided with the ports 28, 29, 30, 31, and 32, which are arranged in such a manner in relation to the ports 13, 14, and 15 in the bottom of the casing 1 that any one or combination of the ports 13, 14, and 15 may be brought into communication with the discharge-nozzle—that is to say, the port 28 may be brought to coincide with the port 13 while the ports 14 and 15 are closed by the valve, as shown in Fig. 8, and while in such a position the liquid in the chamber 3 will be discharged through the discharge-nozzle 16. The ports 28 and 29 may be brought to coincide with the respective ports 13 and 14 while the port 15 is closed by the valve, as shown in Fig. 9, and while in such a position the liquid in the chambers 3 and 4 will be discharged through the discharge-nozzle 16. The ports 30 and 32 may be brought to coincide with the respective ports 13 and 15 while the port 14 is closed by the valve, as shown in Fig. 10, and while in such a position the liquid in the chambers 3 and 5 will be discharged through the discharge-nozzle 16. The ports 28, 29, and 31 may be brought to coincide with the respective ports 13, 14, and 15, and while in such a position the liquid in all of the chambers 3, 4, and 5 is discharged through the discharge-nozzle 16.

From the above it will be seen that liquid in the various amounts may be drawn from the casing, as desired, by the turning of the valve 17.

The valves 12 and 17 are both secured to the valve-stem 20 and are operated in unison by the rotation of said stem, but the ports in the valve 12 are so arranged in relation to the ports on the top of the casing 1 and the ports in the valve 17 in relation to the ports in the bottom of the casing 1 that the ports in the valve 12 will never coincide with the ports in the top of the casing when any of the ports in the valve 17 coincide with any of the ports in the bottom of the casing. Thus it will be seen that the supplies or inlets to the chambers in the casing can never be open when liquid is being drawn from the chambers in the casing through the discharge-nozzle, which prevents any mismeasurements of the liquid and also prevents the liability of leaving the valve or valves in the measuring device in such condition as to draw the liquid from the hogshead or other supply upon the floor or to waste.

As the valve 12 closes the supply of liquid to the chambers when the valve 17 opens the discharge-outlet from any one or more of said chambers, it will be seen that no liquid can be discharged until the respective chambers are supplied with a suitable vent to allow the admission of air to the top of the chamber. To supply the chambers with such vents, I provide the cover of the casing with the perforations 33, 34, and 35. It will be seen that if these vents or perforations are left open after the valve 17 closes the outlet-ports from the casing and the valve 12 has opened the inlet-ports thereto and filled the chambers therein liquid would escape from the casing through said ports. To prevent this, I provide each vent with an automatically-operated valve 36, which is made in the form of a float, and which floats upon the top of the liquid as it has nearly filled the chamber, covering the perforation and pressing against the under side of the cover with sufficient pressure to close said perforation against the escape of the liquid therefrom. These valves are limited in their movements away from the perforations by any suitable and well-known device, which device has been shown on the drawings as consisting of the forked projections 37, cast or otherwise secured to the under side of the cover, having cross pins or bars 38, which engage the pins or projections 39 on the side of the valve, but other and well-known equivalent forms of valves and limiting mechanisms for the movements of said valves may be used in lieu of those shown without departing from my invention. To the upper side of each of the float-valves 36 is attached a projection 40, which projects upward through the perforation in the cover, which projections are of sufficient length to project slightly above the upper surface of the cover when the chamber is filled and the valve to which it is attached is seated upon and closes the perforation, but will be entirely below the upper surface of the cover when the chamber is empty or partially filled. By means of these projections a person is enabled to ascertain whether the chambers in the casing are filled or not, and consequently to tell when the hogshead or other source of supply has been emptied.

In order to determine the proper operation of the handle to draw the desired amount of liquid from the discharge-nozzle, I provide the cover of the casing or any other suitable part thereof with a suitable index 41 to be used in connection with the handle which operates the valves, whereby said amount can be determined. The operation of this index in connection with the handle is such that when the handle is in such a position as to cover or coincide with the "0" on the index, as shown in Fig. 1, the valve 12 will cause open communication to be established between the inlet-passage 7 and all of the chambers 3, 4, and 5; also, the valve 17 will cause the outlets from said chambers to be closed. Therefore all of the chambers will fill from the supply of liquid; but if the handle is turned from this position, so as to cover the "1" on the index, the stem 20 will be turned, so as to rotate the valves 12 and 17 attached thereto, causing the valve 12 to close the inlets to the chambers in the casing and the valve 17 to occupy a position in relation to the outlet-ports 13, 14, and 15 from said chambers, as represented in Fig. 8, and thereby opening the outlet-port from the chamber 3 only. This would cause the discharge from one of the smaller chambers containing one pint, quart, or other unit of measure. If the handle is turned from a position shown in Fig. 1 so as to cover the "2" on the index, the consequent turning of the stem 20 and connected valves will also cause the valve 12 to close the inlets to the chambers and cause the valve 17 to occupy a position, as shown in Fig. 9, in which the outlets 13 and 14 from the two smaller chambers 3 and 4 of equal capacity will be opened, and the contents of said chambers each containing a unit of measure will be discharged, thereby discharging twice as much as when in the position shown in Fig. 8, or twice the unit of measure used. If the handle is turned from the position shown in Fig. 1 so as to cover the "3" on the index, the consequent turning of the stem 20 and its connected valves will still cause the valve 12 to close the inlets to the chambers and cause the valve 17 to occupy a position, as shown in Fig. 10, in which the outlets 13 and 15 from one of the smaller chambers containing one unit of measure used and from the larger chamber containing two units of the measure used will be opened, thereby discharging three times as much as when in the position shown in Fig. 8, or three units of the measure used, and consequently three pints, quarts, or other units of measure. If the handle is turned from the position shown in Fig. 1 so as to cover the "4" on the index, the consequent turning of the stem 20 and its connected valves will also cause the valve 12 to close the inlets to the chambers and cause the valve 17 to occupy a position, as shown in Fig. 11, in which all of the outlets 13, 14, and 15 from all of the chambers in the casing will be opened, and as the sum of the contents of said chambers equals four times the unit of measure used it will be seen that four pints, quarts, or other unit of measure will be discharged when the handle and valves are in this position.

It will be obvious to any person that the size, shape, and even the number of chambers into which the casing is divided may be varied, as desired, that other means than those shown which are within the scope of mechanical skill may be used to attach the measuring device to the receptacle in which the supply of liquid is held, and that it is not essential that the entire measuring device, as shown and described, should be used, as non-essential parts thereof might be dispensed with without departing from my invention.

When individual measures for the various amounts of liquid have been used, it has been customary to keep such measures upon the floor near the hogshead or other receptacle containing the liquid, or they have been hung up in some convenient place; but in some instances boxes or other covered receptacles have been supplied for the reception of the measures. In either of these cases the measures have become dusty, dirty, and when molasses or such liquids are to be measured the measures have been the feeding-ground for numerous flies or other insects, as sufficient quantities of the liquid remains in the measure after it has been used to draw such insects. This has necessitated the washing of the molasses-measures every time that they are used, which causes a wasting of such molasses as remains in the measure. This washing of the measures consumes time, and the wasting of the liquid amounts to considerable.

Having thus fully described the nature, construction, and operation of my invention, I wish to secure by Letters Patent and claim—

1. An automatic liquid-measuring device, consisting of a casing divided into a plurality of chambers, an inlet-passage communicating with all of the chambers in the casing at the same time, and having means to attach it to the receptacle containing the supply of liquid, a chamber at the top of the casing connected with the inlet, a horizontally-rotating valve which is secured to an operating-shaft that passes down through the casing, and which valve is provided with a plurality of openings placed in said chamber to open or close the corresponding openings in the top of the casing, a discharge-nozzle in communication with an outlet from each chamber in the bottom of the casing, a valve located at the bottom of the casing to open and close the communication between any one or combination of the outlets and the nozzle, and a means whereby the valves are operated in unison, substantially as shown.

2. In an automatic liquid-measuring device, a casing divided into chambers of different capacities, and provided with an inlet and an outlet for each chamber, a horizontally-rotating valve which is secured to an operating-shaft that passes down through the casing, and which valve is provided with a plurality of openings to open or close communication between the inlet and chambers, and a valve provided with a plurality of openings to open or close the outlets of the chambers, combined with means to operate the two valves in unison, whereby the inlet-valve will always be closed when any of said outlets are open, and opened when said outlets are closed, substantially as described.

3. In an automatic liquid-measuring device, a casing divided into chambers of different capacities, and having an inlet and an outlet for each chamber, combined with a horizontally-rotating valve which is secured to an operating-shaft that passes down through the casing, and which valve is provided with a plurality of openings for controlling the inlets, and a second valve provided with a plurality of openings for controlling the outlets, and which are operated simultaneously, whereby the liquid can be drawn from any, one, or a combination of two, or from all of said chambers, in order to vary the amount of liquid so drawn by a single operation of the valves, substantially as set forth.

4. In an automatic liquid-measuring device, the tube or pipe 7, having a chamber formed in its outer end, and a vertical opening down through its center, a horizontally-rotating valve 12, provided with suitable openings, an operating-shaft 20 to which the valve 12 is secured near its upper end, an operating-handle also secured to the upper end of the shaft, and a spring 23, combined with a measuring-chamber divided into a series of vertical compartments, each one of which has an opening through both top and bottom, a second valve secured to the lower end of the shaft and provided with openings, and a chamber 16 below the bottom of the shaft, and into which the measuring-chambers discharge, substantially as shown and described.

In testimony whereof I have signed my name to this specification, in the presence of two subscribing witnesses, on this 23d day of June, A. D. 1896.

DAVID S. COY.

Witnesses:
HENRY CHADBOURN,
CORA J. CHADBOURN.